United States Patent
Pan et al.

(10) Patent No.: US 7,669,065 B2
(45) Date of Patent: Feb. 23, 2010

(54) POWER-OFF CIRCUIT

(75) Inventors: Chun-Wei Pan, Guangdong (CN);
Han-Che Wang, Guangdong (CN);
Chen-Hsuan Ho, Guangdong (CN);
Shin-Hong Chung, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 493 days.

(21) Appl. No.: 11/609,314

(22) Filed: Dec. 11, 2006

(65) Prior Publication Data

US 2007/0132319 A1  Jun. 14, 2007

(30) Foreign Application Priority Data

Dec. 12, 2005  (CN) ......................... 2005 1 0102368

(51) Int. Cl.
*G06F 1/26* (2006.01)
(52) U.S. Cl. ................. 713/300; 327/100; 327/365
(58) Field of Classification Search ................. 713/300; 327/100, 365
See application file for complete search history.

(56) References Cited

U.S. PATENT DOCUMENTS

| 3,810,130 | A | * | 5/1974 | Schneider ................... 365/181 |
| 5,500,546 | A | * | 3/1996 | Marum et al. ............... 257/358 |
| 6,359,490 | B1 | * | 3/2002 | Oyamada .................... 327/313 |
| 6,794,921 | B2 | * | 9/2004 | Abe et al. ................... 327/309 |
| 6,879,193 | B2 | | 4/2005 | Okamoto et al. |

\* cited by examiner

*Primary Examiner*—Thuan N Du
(74) *Attorney, Agent, or Firm*—Winston Hsu

(57) ABSTRACT

A power-off circuit includes a power unit (10), a power management unit (20), an integrated circuit chip (IC chip, 40), a switching apparatus (30), and a clamp circuit (70). The switching apparatus produces and transmits a power-off instruction to the power management unit. The power management unit produces and transmits a power-off notice to the IC chip in accordance with the power-off instruction. And the IC chip feeds back a power-off affirmation in accordance with the power-off notice to the clamp circuit. The clamp circuit receives the power-off affirmation and produces and transmits interrupted power-off signals to the power management unit, till the power management unit completely cuts off power supplied from the power unit to the IC chip.

11 Claims, 4 Drawing Sheets

POWER-OFF CIRCUIT

BACKGROUND

1. Technical Field

The present invention relates to a power-off circuit.

2. Related Art

Referring to FIG. 4, a power-off circuit in related art is shown. A power management unit 20 is electrically connected between an integrated circuit chip (IC chip, e.g., CPU) 40 and a power unit 10 which supplies power, and used for controlling power supplied via power lines 61 and 62 to the IC chip 40. A switching apparatus 30 is connected to the power management unit 20 and used to supply instructions including a power-off instruction to the power management unit 20 at a user's operation. The power management unit 20 includes a detection unit 21 and a control unit 22. The detection unit 21 detects the power off instruction supplied by the switching apparatus 30 and accordingly transmits a power-off notice to the IC chip 40 via a signal line 52. The IC chip 40 includes a reset circuit 41 and a control circuit 42. The control circuit 42 affirms the power off notice and feeds back a power-off affirmation to the power management unit 20 via a signal line 53. The control unit 22 of the power management unit 20 then cuts off the power supplied to the IC chip 40.

According to the power-off circuit in the related art, if the user transiently operates the switching apparatus 30 and decreases the power supplied to the IC chip 40, the reset circuit 41 of the IC chip 40 finds that the power supply thereto is decreased and produces a reset signal to the power management unit 20 via the signal line 53. The reset signal causes the control unit 22 of the power management unit 20 to resume the power supply of the IC chip 40. Therefore, a transient operation on the switching apparatus 30 hardly powers off the IC chip 40.

Therefore, there is a need for providing a power-off circuit which can solve the above-mentioned problem.

SUMMARY

A power off circuit is provided in accordance with preferred embodiments. The power-off circuit includes a power unit, a power management unit, an integrated circuit (IC) chip and a switching apparatus. The switching apparatus is used for producing and transmitting a power-off instruction to the power management unit, the power management unit is used for producing and transmitting a power-off notice to the IC chip in accordance with the power-off instruction, and the IC chip is configured to feed back a power-off affirmation in accordance with the power-off notice. The power-off circuit further includes a clamp circuit which is configured to receive the power-off affirmation and produce and transmit uninterrupted power-off signals to the power management unit, till the power management unit completely cuts off power supplied from the power unit to the IC chip.

Other advantages and novel features will be drawn from the following detailed description with reference to the attached drawings, in which:

DETAILED DESCRIPTION OF THE EMBODIMENTS

Figure 1:
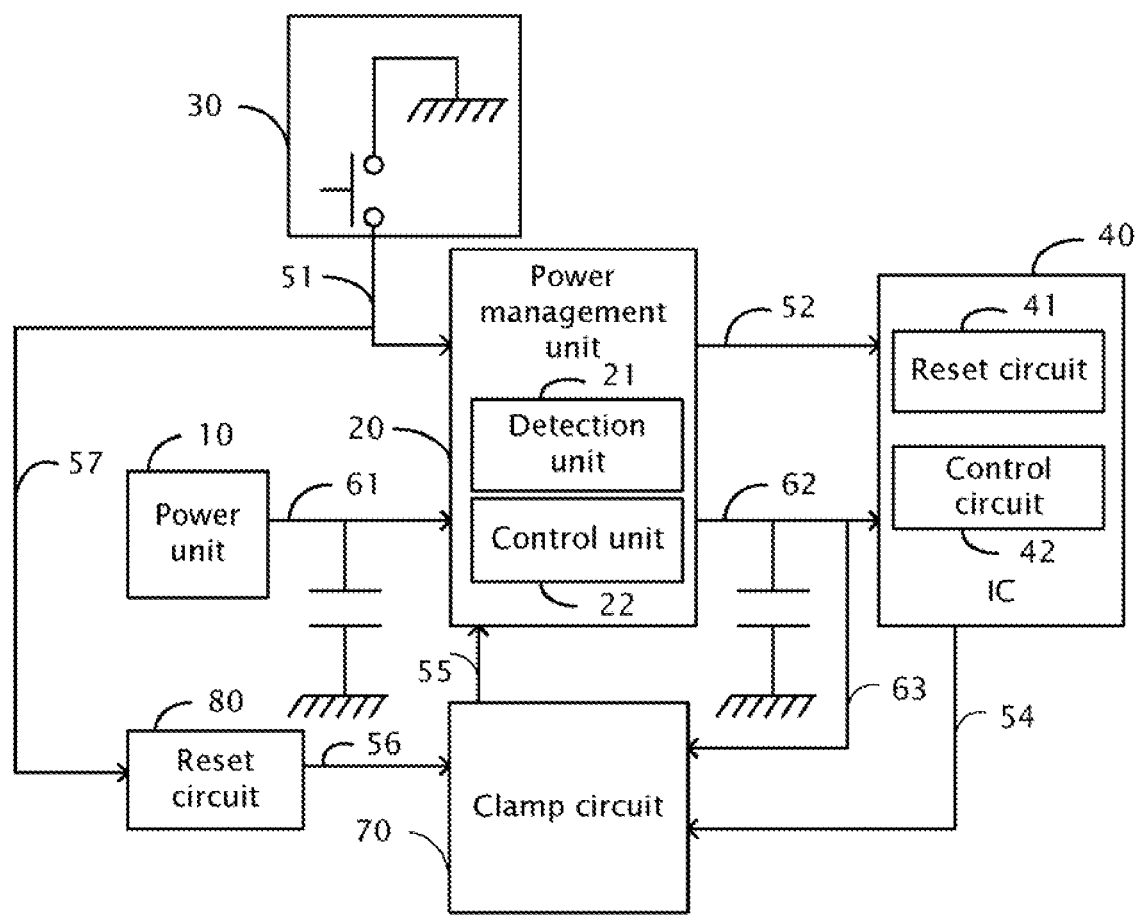
FIG. 1 depicts an exemplary block diagram of a power-off circuit in accordance with a preferred embodiment of the present invention.
Figure 2:
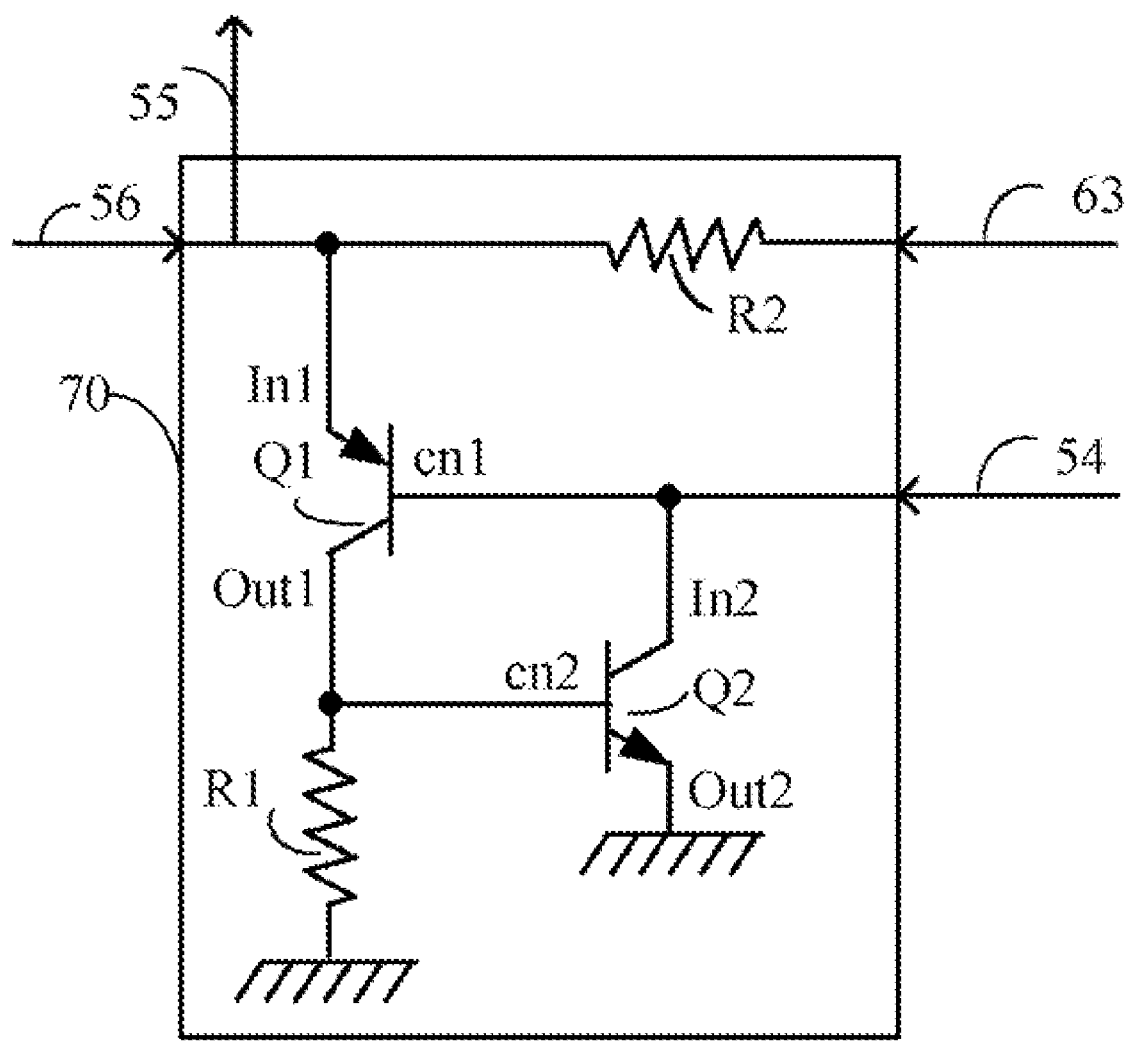
FIG. 2 depicts a circuit diagram of a clamp circuit of the power-off circuit of FIG. 1.

Referring to FIGS. 1 and 2. As compared with the power-off circuit of the related art including a power unit 10, a power management unit 20, a switching apparatus 30 and an integrated circuit (IC) chip 40, the power-off circuit provided by the preferred embodiment further includes a clamp circuit 70. The clamp circuit 70 is electrically connected between the IC chip 40 and the power management unit 20. The clamp circuit 70 receives power supply from the power management unit 20 via power lines 62 and 63. The clamp circuit 70 receives a power-off affirmation from the IC chip 40 via a signal line 54, and produces and transmits uninterrupted power off signals to the power management unit 20 via a signal line 55, till the power management unit 20 completely cuts off the power supplied to the IC chip 40 via the power line 62.

The clamp circuit 70 includes two switching circuits: a first switching circuit Q1 and a second switching circuit Q2. The first and second switching circuits Q1 and Q2 clamps each other after receiving the power-off affirmation from the IC chip 40. The first and second switching circuits Q1 and Q2 are controllable three-terminal circuits and each includes a control terminal, an input terminal, and an output terminal.

The control terminal Cn1 of the first switching circuit Q1 and the input terminal In2 of the second switching circuit Q2 are connected together to the signal line 54. The control terminal Cn2 of the second switching circuit Q2 and the output terminal Out1 of the first switching circuit Q1 are connected together to a common reference potential via a first resistance component R1. The common reference potential and the first resistance component R1 are shown in FIG. 2 as ground potential and a resistor R1 respectively. The input terminal In1 of the first switching circuit Q1 is connected to the signal line 55, as well as to the power line 63 via a second resistance component R2, shown in FIG. 2 as a resistor R2. The output terminal Out2 of the second switching circuit Q2 is connected to the common reference potential that is also shown in FIG. 2 as ground potential.

Via such a configuration described above, a relationship of clamping each other is established between the first and second switching circuits Q1 and Q2. A conduction state of the first switching circuit Q1 is controlled by the power off affirmation from the IC chip 40, causing a conduction state of the second switching circuit Q2. The conduction state of the second switching circuit Q2 further maintains the conduction state of the first switching circuit Q1. The clamp circuit 70 then continuously outputs power-off signals to the power management unit 20 and finally causes the power management unit 20 to completely cut off power supply to the IC chip 40.

An example is given as follows to illustrate the operation of the clamp circuit 70 after receiving the power-off affirmation. In this example, the first switching circuit Q1 is a PNP transistor including a base, a collector, and an emitter. The base, the collector and the emitter of the PNP transistor respectively form the control terminal Cn1, the input terminal In1 and the output terminal Out1 of the first switching circuit Q1. The second switching circuit Q2 is an NPN transistor Q2 including a base, a collector and an emitter. The base, the collector and the emitter of the NPN transistor respectively form the control terminal Cn2, the input terminal In2 and the output terminal Out2 of the second switching circuit Q2. The emitter of the PNP transistor and the base of the NPN transistor are grounded via the resistor R1, and the emitter of the NPN transistor is directly grounded.

The PNP transistor receives the power-off affirmation at the base thereof. The power-off affirmation is a low voltage level signal and causes a conduction state of the PNP transistor. A conduction path from the power line 63 to ground via the resistors R2 and R1 and the PNP transistor is formed and causes the collector of the PNP transistor to change from a high voltage level to a low voltage level. The signal line 55 therefore transmits a low voltage level power off signal to the power management unit 20. A potential at the base of the NPN transistor is higher than the ground potential due to the conduction state of the PNP transistor, and forms a positive bias between the base and the emitter of the NPN transistor. A conduction state of The NPN transistor is also formed and maintains the collector of the NPN transistor nearly at the ground potential. The base of the PNP transistor is connected with the collector of the NPN transistor and therefore nearly at the ground potential. The PNP transistor is accordingly maintained at the conduction state and the clamp circuit 70 continuously outputs low voltage level power-off signals to the power management unit 20. The continuous low voltage level power-off signals cause the power management unit to completely cut off the power supply of the IC chip 40, even if the reset circuit 41 produces a reset signal that attempts to resume the power supply of the IC chip 40 when detecting the power supply to the IC chip 40 is decreased.

Hence, according to the power-off circuit provided by the preferred embodiment, whenever the user operates the switching apparatus 30 and produces a power-off instruction to the power management unit 20, the power management unit 20 consequentially cuts off the power supply of the IC chip 40, regardless of a time length (short or long) the user uses to perform an operation on the switching apparatus 30.

As described in the foregoing, the clamp circuit 70 is supplied with power via the power line 62. Hence, when the power supply of the IC chip 40 is completely cut off, the clamp circuit 70 is also powered off. The clamp circuit 70 stops functioning.

In the preferred embodiment, a resistance value of the first resistance component R1 is chosen in considering that, during the conduction state of the first switching circuit Q1, the power management unit 20 receives power off signals via the signal line 55. In contrast, a resistance value of the second resistance component R2 is chosen in considering that, after the IC chip 40 is powered off and that the power line 62 is at a relative low or at zero potential, the power management unit 20 does not receive power off signal via the signal line 55. Thus, a resistance value of the second resistance component R2 is preferably larger than a resistance value of the first resistance component R1.

Figure 3:
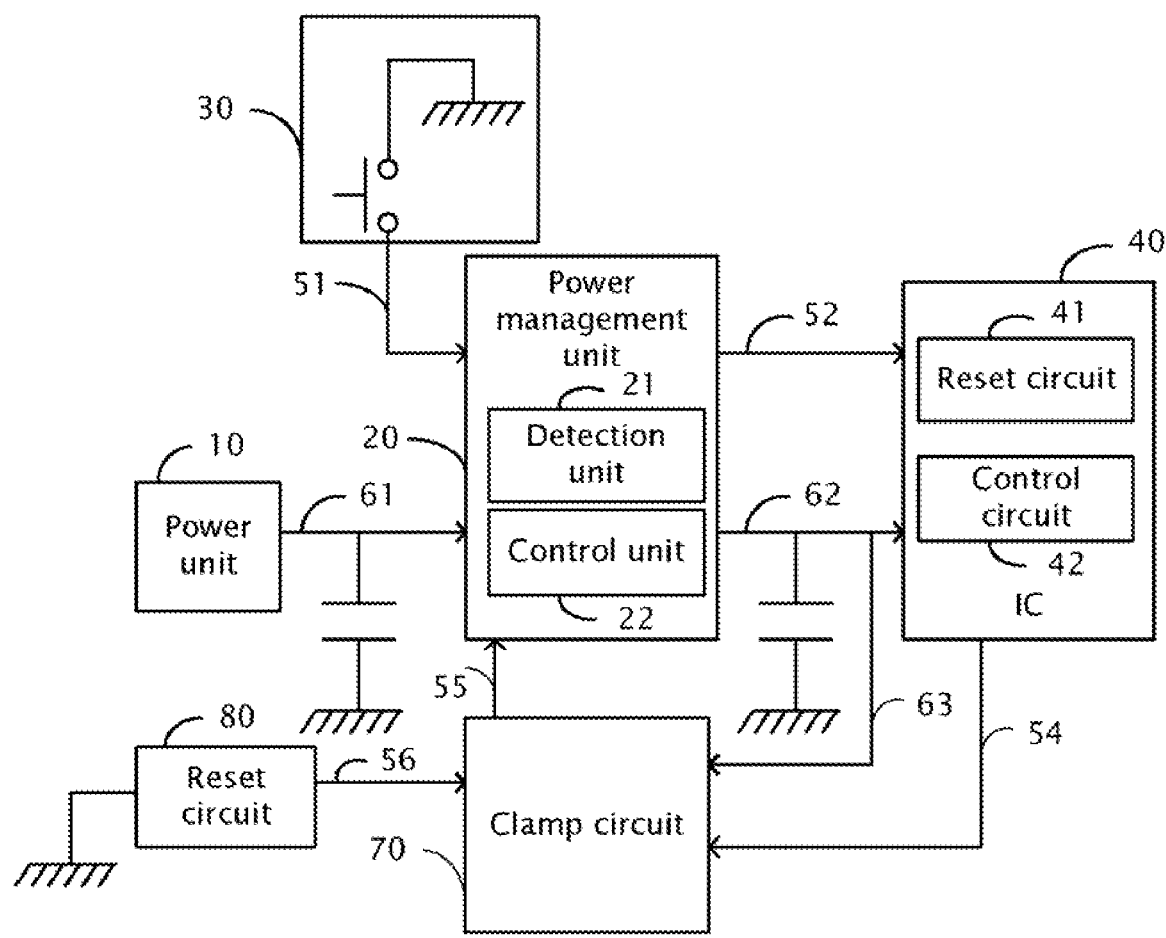
FIG. 3 is similar to FIG. 1, excepting a connection of a reset circuit.
Figure 4:
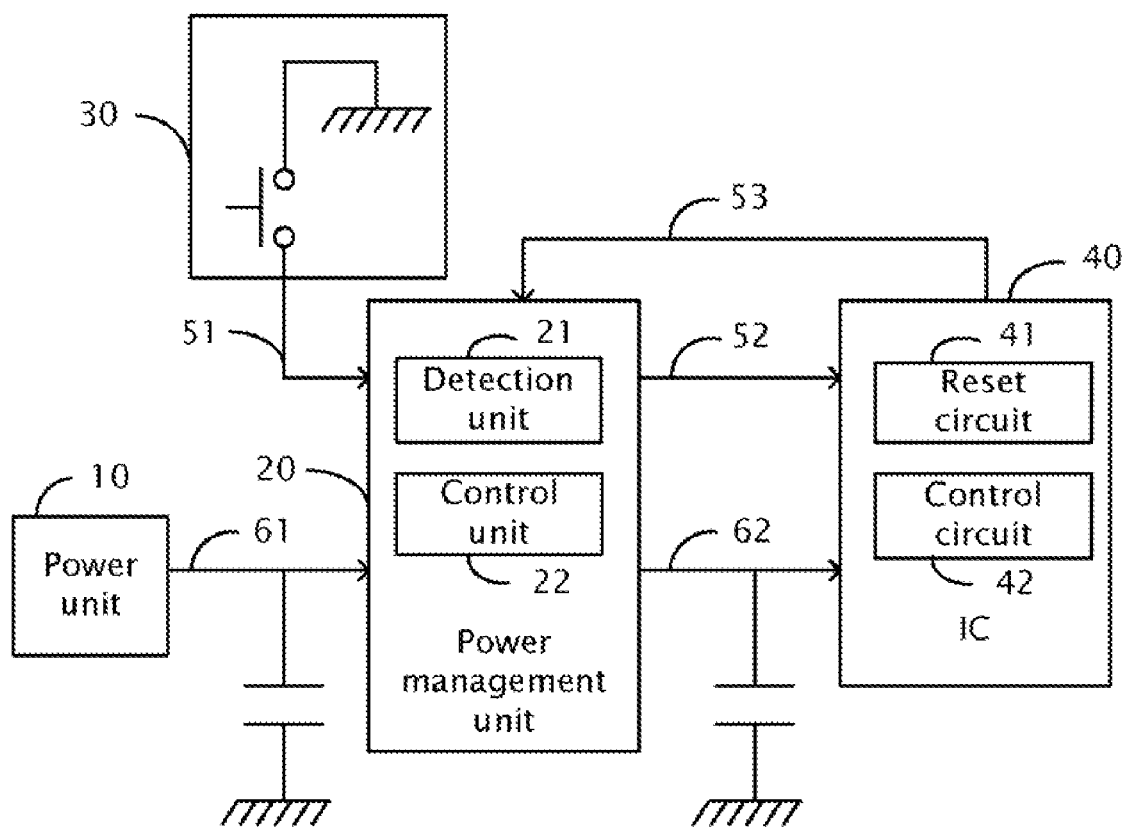
FIG. 4 is a block diagram of a power-off circuit in the related art.

In an alternative embodiment, the power off circuit of the preferred embodiment may further include a reset circuit 80. The reset circuit 80 is connected with the clamp circuit 70 via a signal line 56 and used to block the clamp circuit 70 from functioning in case that: after the IC chip 40 is powered off, the power line 63 is still maintained at a certain potential and therefore causes the clamp circuit 70 to continually produce and transmit power-off signals to the power management unit 20. The reset circuit 80 in one example is connected between the switching apparatus 30 and the clamping circuit 70 as shown in FIG. 1. The reset circuit 80 is a unidirectional unit such as a diode. The unidirectional unit connects the switching apparatus 30 to the input terminal In1 or to the output terminal Out1 of the first switching circuit Q1. The user can operate the switching apparatus 30 and stop the clamping between the first and second switching circuit Q1 and Q2. The reset circuit 80 in another example is a second switching apparatus is connected between the first switching circuit Q1 and ground as shown in FIG. 3, specifically, the second switching apparatus is connected to the input terminal In1 of the first switching circuit Q1 or to the output terminal Out1 of the first switching circuit Q1. The user can operate the second switching apparatus and stop the clamping between the first and second switching circuit Q1 and Q2.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A power-off circuit, comprising a power unit, a power management unit, an integrated circuit (IC) chip, a switching apparatus and a clamp circuit, the power unit supplying power, the switching apparatus producing and transmitting a power-off instruction to the power management unit, the power management unit producing and transmitting a power-off notice to the IC chip in accordance with the power-off instruction, the IC chip feeding back a power-off affirmation in accordance with the power-off notice, and the clamp circuit receiving the power-off affirmation and producing and transmitting uninterrupted power-off signals to the power management unit, till the power management unit cuts off power supplied from the power unit to the IC chip.

2. The power-off circuit as claimed in claim 1, wherein the clamp circuit comprising a first switching circuit and a second switching circuit, each clamping one another to conduct upon receiving the power-off affirmation and consequentially producing and transmitting the power-off signals to the power management unit.

3. The power-off circuit as claimed in claim 2, wherein each of the first switching circuit and the second switching circuit comprises a control terminal, an input terminal and an output terminal, the control terminal of the first switching circuit and the input terminal of the second switching circuit being connected together to the IC chip to receive the power-off affirmation, the control terminal of the second switching circuit and the output terminal of the first switching circuit being connected together to a common reference potential via a first resistance component, the input terminal of the first switching circuit being connected to a power line via a second resistance component, and to the power management unit, the power line being connected to the power management unit, the output terminal of the second switching circuit being connected to the common reference potential.

4. The power-off circuit as claimed in claim 3, wherein the power line is used by the power management to supply power to the IC chip.

5. The power-off circuit as claimed in claim 4, further comprising a reset circuit used for blocking the first switching circuit and the second switching circuit from functioning after the power supplied to the IC chip is cut off.

6. The power-off circuit as claimed in claim 5, wherein the reset circuit is a second switching apparatus connected between the input terminal of the first switching circuit and ground.

7. The power-off circuit as claimed in claim 5, wherein the reset circuit is a second switching apparatus connected between the output terminal of the first switching circuit and ground.

8. The power-off circuit as claimed in claim 5, wherein the reset circuit is a unidirectional unit connecting the switching apparatus to the input terminal of the first switching circuit.

9. The power-off circuit as claimed in claim 5, wherein the reset circuit is a unidirectional unit connecting the switching apparatus to the output terminal of the first switching circuit.

10. The power-off circuit as claimed in claim 3, wherein the common reference potential is ground potential.

11. The power-off circuit as claimed in claim 3, wherein the first resistance component and the second resistance component have resistance values to ensure that the clamping circuit produces and transmits power off signals only during a conduction state of the first switching circuit.

* * * * *

UNITED STATES PATENT AND TRADEMARK OFFICE
CERTIFICATE OF CORRECTION

PATENT NO. : 7,669,065 B2
APPLICATION NO. : 11/609314
DATED : February 23, 2010
INVENTOR(S) : Pan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 567 days.

Signed and Sealed this

Seventh Day of December, 2010

David J. Kappos
*Director of the United States Patent and Trademark Office*